United States Patent
Nicastri

(10) Patent No.: US 11,528,314 B2
(45) Date of Patent: Dec. 13, 2022

(54) WEBASSEMBLY MODULE WITH MULTIPLE DECODERS

(71) Applicant: Honeywell International Inc., Morris Plains, NJ (US)

(72) Inventor: James Nicastri, Sydney (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 56 days.

(21) Appl. No.: 16/831,618

(22) Filed: Mar. 26, 2020

(65) Prior Publication Data

US 2021/0306397 A1 Sep. 30, 2021

(51) Int. Cl.
*H04L 65/70* (2022.01)
*H04N 21/434* (2011.01)
*H04N 21/439* (2011.01)
*H04N 21/442* (2011.01)
*H04N 21/438* (2011.01)
*H04L 65/61* (2022.01)

(52) U.S. Cl.
CPC .............. *H04L 65/70* (2022.05); *H04L 65/61* (2022.05); *H04N 21/434* (2013.01); *H04N 21/439* (2013.01); *H04N 21/4383* (2013.01); *H04N 21/442* (2013.01)

(58) Field of Classification Search
CPC .............. H04N 21/442; H04N 21/439; H04N 21/4383; H04N 21/434; H04L 65/607; H04L 65/4069; H04L 65/61; H04L 65/70
See application file for complete search history.

(56) References Cited

U.S. PATENT DOCUMENTS

| | | | |
|---|---|---|---|
| 7,843,437 B1 * | 11/2010 | Arnold | G06F 16/9577 345/169 |
| 9,628,810 B1 * | 4/2017 | Bingol | H04N 19/93 |
| 9,712,589 B2 | 7/2017 | Hiltch et al. | |
| 9,930,308 B2 | 3/2018 | Balko | |
| 10,862,940 B1 * | 12/2020 | Jones | H04L 65/607 |
| 10,965,780 B2 * | 3/2021 | Gorin | H04L 67/34 |

(Continued)

FOREIGN PATENT DOCUMENTS

| | | |
|---|---|---|
| CN | 109088887 A | 12/2018 |
| CN | 110198479 A | 9/2019 |

(Continued)

OTHER PUBLICATIONS

"WebAssembly," Wikipedia, 9 pages, accessed Mar. 26, 2020.

*Primary Examiner* — James R Sheleheda
(74) *Attorney, Agent, or Firm* — Seager, Tufte & Wickhem, LLP

(57) ABSTRACT

A method for delivering a web page that displays a video includes delivering a requested web page with a WebAssembly Module to a web browser of a requesting device. The WebAssembly Module includes a plurality of video decoders each for decoding a corresponding one of a plurality of video encoding formats. An encoded video is delivered for display by the requested web page, the encoded video being encoded in a particular one of the plurality of video encoding formats. The encoded video is decoded using a respective one of the plurality of video decoders of the WebAssembly Module that corresponds to the particular one of the plurality of video encoding formats of the delivered encoded video.

20 Claims, 7 Drawing Sheets

(56) References Cited

U.S. PATENT DOCUMENTS

| | | | |
|---|---|---|---|
| 2002/0104096 A1* | 8/2002 | Cramer | H04N 21/8193 348/E7.071 |
| 2002/0186770 A1 | 12/2002 | Jawerth et al. | |
| 2006/0148569 A1* | 7/2006 | Beck | H04N 19/42 463/43 |
| 2010/0088733 A1* | 4/2010 | Chan | H04N 21/43632 725/80 |
| 2011/0138354 A1* | 6/2011 | Hertenstein | G06F 3/048 717/115 |
| 2013/0279602 A1* | 10/2013 | Wang | H04N 19/136 375/240.26 |
| 2018/0245944 A1* | 8/2018 | Akselrod | G01C 21/3691 |
| 2019/0372980 A1* | 12/2019 | Nakamura | H04L 67/42 |
| 2020/0020302 A1* | 1/2020 | Nevase | G09G 5/10 |
| 2020/0250372 A1* | 8/2020 | Remington | H04L 67/38 |

FOREIGN PATENT DOCUMENTS

| | | | |
|---|---|---|---|
| CN | 111355976 A | * | 6/2020 |
| WO | 2018197911 A1 | | 1/2018 |

* cited by examiner

WEBASSEMBLY MODULE WITH MULTIPLE DECODERS

TECHNICAL FIELD

The present disclosure relates generally to decoding and displaying video on a webpage within a web browser. More particularly, the present disclosure relates to methods and systems for supplementing the video decoding capabilities of a web browser without requiring the pre-installation of video decoder plug-ins on the web browser.

BACKGROUND

Web pages are frequently used to display a variety of different types of information within a web browser. In some cases, web pages are used to display videos such as but not limited to security videos. There are a variety of different video formats (codecs) that each require a particular video decoder to properly decode and display the video. Web browsers typically have some basic video decoders natively built-in for decoding some common video formats. However, to properly display a web page that includes a video that is encoded in a video format that is not natively supported by the web browser, a user must typically pre-install an appropriate plug-in or vendor specific extension to the web-browser. The pre-installed plug-in or vendor specific extension to the web-browser essentially adds the desired video decoding capability to the web-browser. Some major video formats that are generally not natively supported by web browsers include H265, Motion JPEG & MPEG4 Part 2.

In some applications, such as security Video Management System (VMS) applications, cameras and network video encoders are often configured to provide video stream(s) in many different video formats, many often do not align with the limited video formats natively supported by web browsers. Thus, the video streams may not be able to be sent directly to the web browser for viewing using native features of the web browser. Thus, appropriate plugins or vendor specific extensions must be identified and pre-installed on the web browser before the video streams can be displayed. Searching out and installing such plugins or vendor specific extensions can be time consuming and tedious. What would be desirable are methods and systems for displaying videos in a web browser that have video formats that are not natively supported by the web browser without requiring the pre-installation of appropriate plug-ins or vendor specific extensions to the web-browser.

SUMMARY

The present disclosure relates generally to decoding and displaying video on a webpage within a web browser. More particularly, the present disclosure relates to methods and systems for supplementing the video decoding capabilities of a web browser without requiring the pre-installation of video decoder plug-ins on the web browser. This may be accomplished by delivering along with the web page a WebAssembly Module that has multiple video decoders built in to support decoding and displaying the video stream(s) referenced on the web-page.

In one example, a method for delivering a web page that displays a video includes delivering a requested web page that includes a WebAssembly Module to a web browser of a requesting device. The WebAssembly Module includes a plurality of video decoders each for decoding a corresponding one of a plurality of video encoding formats. An encoded video is delivered for display by the requested web page, the encoded video being encoded in a particular one of the plurality of video encoding formats. The encoded video is decoded using a respective one of the plurality of video decoders of the WebAssembly Module that corresponds to the particular one of the plurality of video encoding formats of the delivered encoded video.

In another example, a system includes a memory that is configured to store executable instructions and a processor that is operably coupled to the memory and is configured to execute the executable instructions. When the processor executes the executable instructions, the processor receives from a web browser a request for delivery of a requested web page, the requested web page requesting display of a video encoded in a particular one of a plurality of video encoding formats, where the web browser does not have a video decoder for the particular one of the plurality of video encoding formats. The processor delivers the requested web page including a WebAssembly Module to the web browser, the delivered WebAssembly Module including a plurality of video decoders each for decoding a corresponding one of the plurality of video encoding formats. The WebAssembly Module decodes the encoded video using a respective one of the plurality of video decoders included in the WebAssembly Module that corresponds to the particular one of a plurality of video encoding formats.

In another example, a non-transitory, computer-readable storage medium has stored thereon instructions that implement a WebAssembly Module, the WebAssembly Module augmenting video decoding capabilities of a web browser running on a host device, the WebAssembly Module delivered to the web browser with a web page that displays an encoded video that is encoded in a particular one of a plurality of video encoding formats. When the WebAssembly Module is executed by the host device, the host device decodes the encoded video using a particular one of a plurality of video decoders implemented by the WebAssembly Module that corresponds to the particular one of the plurality of video encoding formats of the delivered encoded video. The host device then renders the decoded video on a display of the host device.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
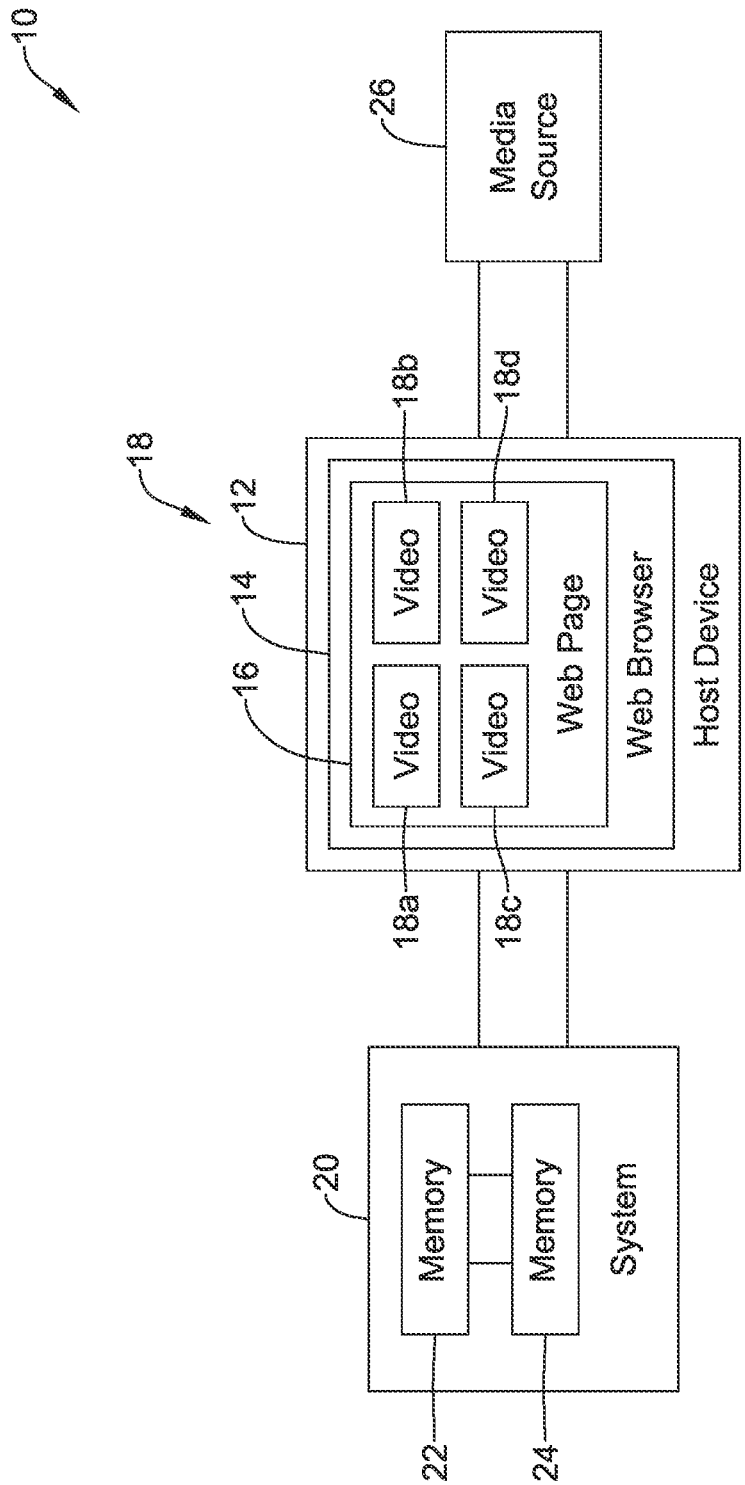
FIG. 1 is a schematic block diagram of an illustrative system for displaying web pages.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of a video system 10 that affords web browsers the ability to display any of a variety of different types of videos. The video system 10 includes a host device 12. The host device 12 may represent, for example, a desktop computer and monitor setup, a laptop, a tablet computer, a mobile phone and/or any other suitable host device suitable for displaying a web-page in a web browser. In some cases, the host device 12 may represent a dumb terminal operatively coupled to a remote server. In any event, the host device 12 may be configured to execute a web browser 14. The web browser 14 may be considered as being software or a collection of software that allows the host device 12 to display one or more web pages on a display screen. There are a variety of different web browsers in existence, including but not limited to Google Chrome, Firefox, Internet Explorer, Opera, Safari, Edge, Maxthon, Flock, SeaMonkey, Avant, K-Meleon and Konqueror, among others.

Regardless of which web browser 14 is used, the web browser 14 is able to display a web page 16. As shown schematically, the illustrative web page 16 displays a total of four videos 18, individually labeled as 18a, 18b, 18c and 18d. In some instances, the web page 16 may display any number of videos 18, limited only by the physical size of the monitor or other display that the web page 16 is being displayed on, as well as the desired size of each displayed video 18. It will be appreciated that the web page 16 may also display a variety of text, photos, hyperlinks, advertisements and the like, limited only by the creativity of the web page designer. For simplicity, only the videos 18 are schematically represented in FIG. 1. Typically, the videos 18 are delivered to the web-browser in an encoded format, and must be decoded before they are rendered for display on the web page 16. The reference number 18 shall be used herein to refer both to encoded videos and subsequently to decoded videos, as indicated by context.

The illustrative video system 10 may include a system 20 that may be configured to help the web browser 14 properly display any of a variety of different types of videos without requiring the web browser 14 itself be programmed to include the decoders needed to properly decode, modify (resizing, recoloring and the like) and display each of the videos 18. The system 20 may be manifested in a stand-alone computer or in a remote server, and may be configured to communicate with the web browser 14 hosted by the host device 12 in order to ascertain what particular types of videos 18 are to be displayed by the web browser 14, and thus what decoders may be needed that are not already part of the programming of the native web browser. The system 20 may include a memory 22 that is configured to store executable instructions and a processor 24 that is operably coupled to the memory 22 for executing the executable instructions.

The processor 24 executing the executable instructions may cause the processor 24 to receive from a web browser (such as the web browser 14) a request for delivery of a requested web page (such as the web page 16). The requested web page may request display of a video (such as one of the videos 18) encoded in a particular one of a plurality of video encoding formats. The requesting web browser may not have a video decoder for the particular one of the plurality of video encoding formats. As such, the processor 24 may deliver the requested web page with a WebAssembly Module to the web browser 14. The WebAssembly Module may be considered as being a resource that is delivered to the web browser 14 along with the requested web-page to help the web browser 14 properly decode and/or display videos 18 included or referenced by the web page 16. The delivered WebAssembly Module may include a plurality of video decoders each for decoding a corresponding one of a plurality of video encoding formats, and may be configured to decode the encoded video(s) 18 using a respective one of the plurality of video decoders included in the WebAssembly Module that corresponds to the particular one of a plurality of video encoding formats of the encoded video(s) 18. Sending a WebAssembly Module with multiple video decoders versus sensing multiple WebAssemblies each with a single video decoder may have the advantage of significantly reducing the required data transfer for display of a corresponding web page. Thus the bandwidth on the communication channel delivering the web page may be reduced. In some cases, the web browser 14 may be considered as operating in a sand box of the requesting device (such as the web browser 14 or the host device 12). The WebAssembly Module may be restricted to the same sand box. As such, the WebAssembly Module should not compromise the built-in security features of the web browser 14. Also, since the WebAssembly Module provides the video decoders along with the delivery of the web page, updates to the video decoders in the WebAssembly Module can be made once at the system 20 and the host device 12 will then receive the updated decoders on the next web page (and WebAssembly Module) retrieval.

In some cases, the requested web page may request display of at least two videos 18 each encoded in a different one of the plurality of video encoding formats included in the WebAssembly Module, and the WebAssembly Module may decode each of the at least two videos 18 using a corresponding one of the plurality of video decoders of the WebAssembly Module. In some instances, the WebAssembly Module may create one or more channels, and the requested web page 16 may be configured to initialize a first video decoding channel in the WebAssembly Module for decoding a first one of the at least two videos 18 and initialize a second video decoding channel in the WebAssembly Module for decoding a second one of the at least two videos 18. The video channels may decode their corresponding videos in a parallel fashion.

The illustrative video system 10 also includes a media source 26. The media source 26 may represent a memory within a server or other computer that stores video clips, video streams and the like until display of these videos is requested. The media source 26 may represent one or more video cameras that are live-streaming content. Accordingly, in some cases, the requested web page 16 may be configured to initiate a connection to the media source 26 and to send one or more commands to the media source 26 to start delivery of an encoded video to the requested web page 16. In some cases, the media source 26 may be a video recorder. In some cases, the media source 26 may be remote from the system 20 as shown, or part of the system 20.

The requested web page 16 may be configured to carry out a number of different video processing activities. For example, the requested web page 16 may be configured to identify an output color space format for the decoded video 18, and the WebAssembly Module may be configured to convert a color space format of the decoded video 18 to the identified output color space format. Additionally or alternatively, the requested web page 16 may be configured to identify a resolution for the decoded video 18, identify a predetermined output resolution for the decoded video 18, and the WebAssembly Module may be configured to resize the resolution of the decoded video 18 to the predetermined output resolution. These are additional functions that the WebAssembly Module may provide to a native web browser.

In some cases, the requested web page 16 may be configured to identify a particular one of the plurality of video encoding formats for an encoded video. In response, a first channel of the WebAssembly Module may be initialized to receive the encoded video having the particular one of the plurality of video encoding formats and to decode the received encoded video using a corresponding one of the plurality of video decoders of the WebAssembly Module. The requested web page 16 may also identify one or more of a resolution, a frame rate, an output color space format and a target output resolution for the encoded video, and in response may notify the WebAssembly Module of the identified one or more of the resolution, the frame rate, the output color space format and/or the target output resolution. In some cases, the WebAssembly Module may convert a color space format of the decoded video into the identified output color space format. In some cases, the WebAssembly Module may identify a resolution for a particular decoded video and may identify the target output resolution for the decoded video, and may resize the resolution of the decoded video to match the identified target output resolution.

In some cases, the requested web page 16 may request delivery of an encoded audio stream. It is contemplated that the WebAssembly Module may also provide one or more audio decoders for decoding such encoded audio streams. An audio decoding channel may be initialized within the WebAssembly Module for decoding an encoded audio stream, and the encoded audio stream may be decoded using the initialized audio decoding channel in the WebAssembly Module. In some cases, the WebAssembly Module may be configured to resample the decoded audio stream to meet a predetermined sample rate before playing the decoded audio stream via the web page 16.

Figure 2:
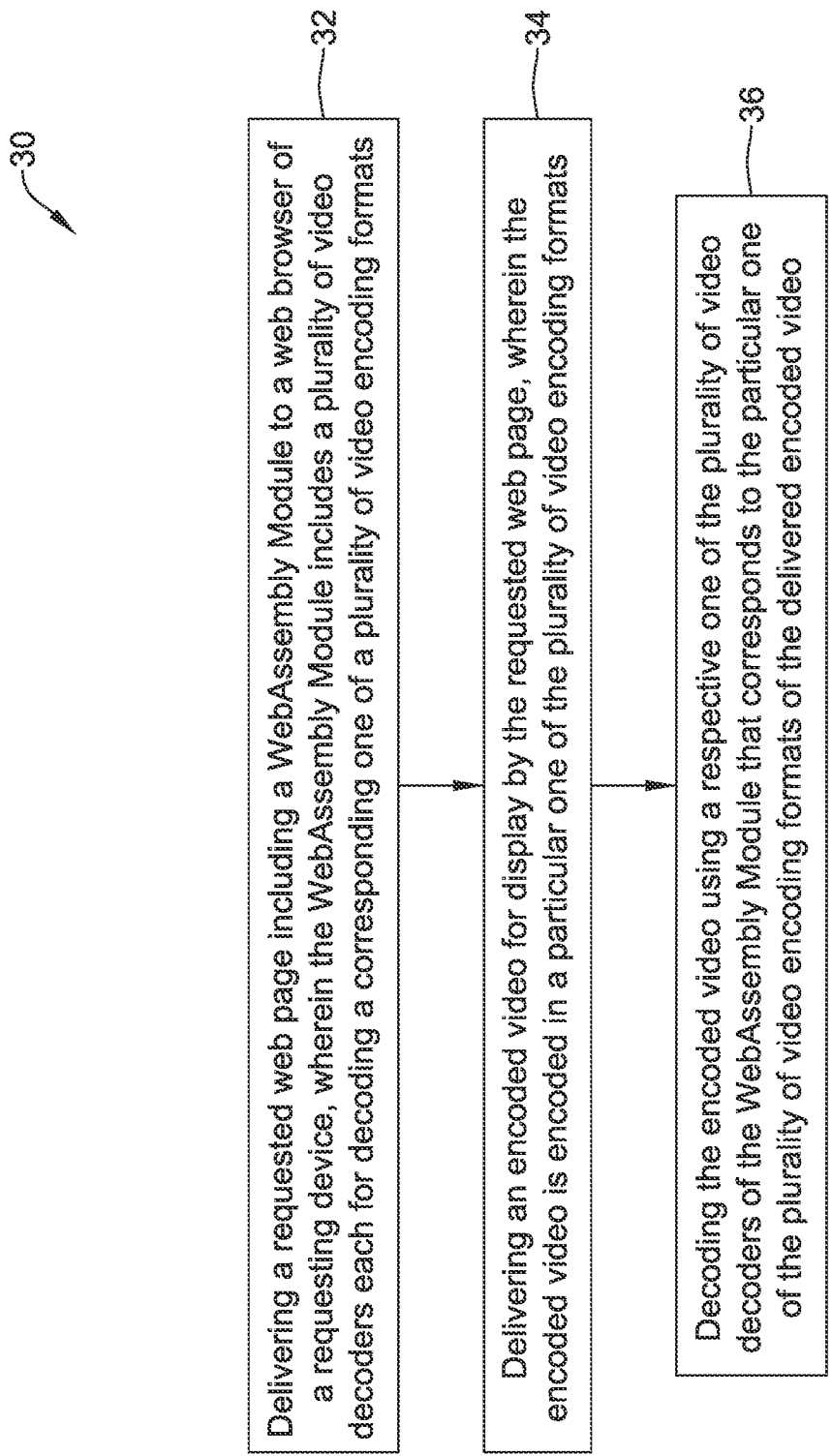
FIG. 2 is a flow chart showing an illustrative method for delivering a web page.

FIG. 2 is a flow diagram showing an illustrative method 30 for delivering a web page that displays a video. In some instances the web browser operates in a designated sand box of the requesting device, and the WebAssembly Module may be restricted to operating in the same sand box. A requested web page that includes a WebAssembly Module is delivered to a web browser of a requesting device, as indicated at block 32. The Web Assembly Module includes a plurality of video decoders each for decoding a corresponding one of a plurality of video encoding formats. An encoded video is delivered for display by the requested web page, wherein the encoded video is encoded in a particular one of the plurality of video encoding formats, as indicated at block 34. In some cases, the encoded video includes an encoded video stream. The encoded video is decoded using a respective one of the plurality of video decoders of the WebAssembly Module that corresponds to the particular one of the plurality of video encoding formats of the delivered encoded video, as indicated at block 36. In some cases, the web page may initiate a connection to a media source, and one or more commands may be sent to the media source to start streaming of the encoded video stream to the web page.

Figure 3:
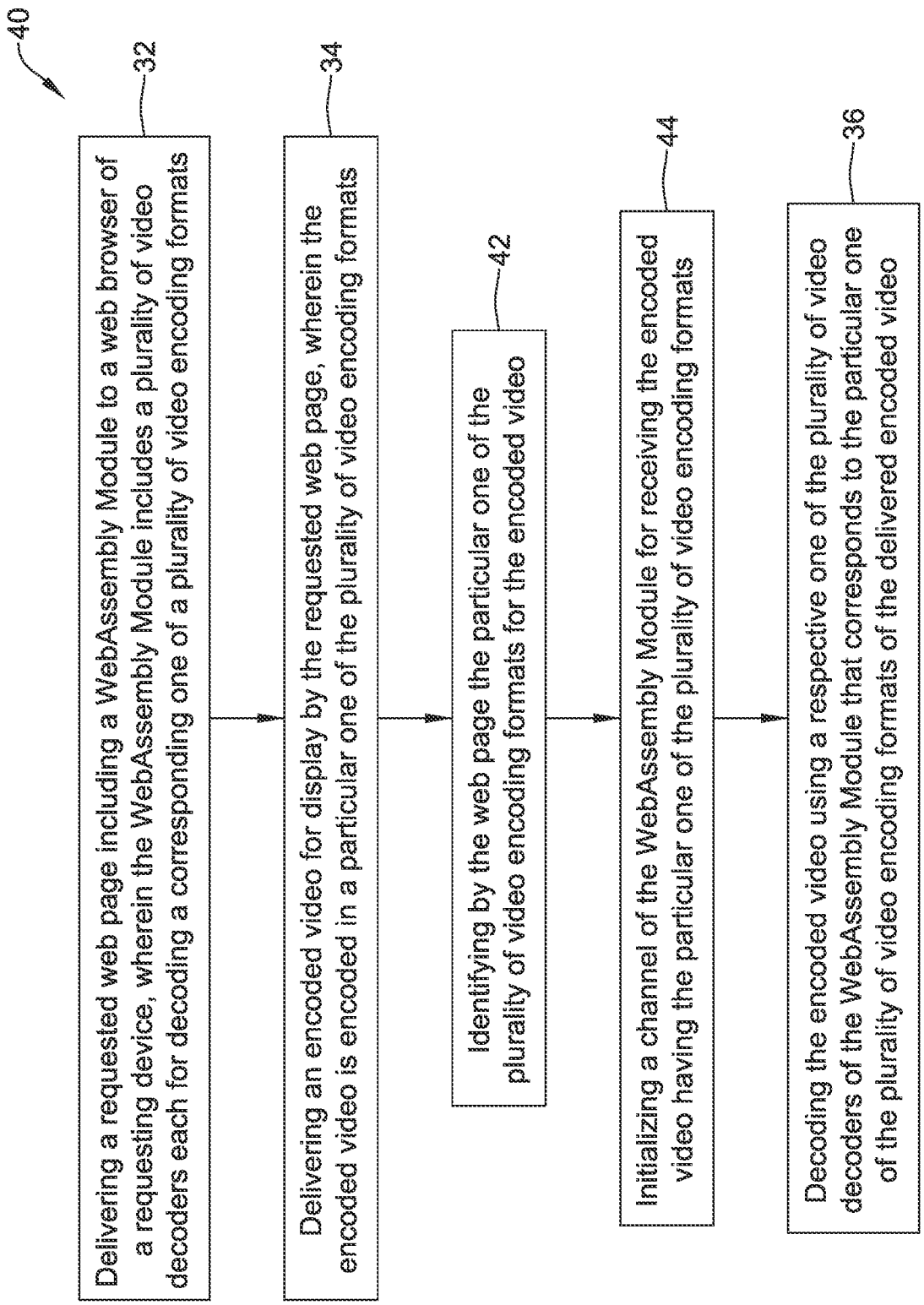
FIG. 3 is a flow chart showing an illustrative method for delivering a web page.

FIG. 3 is a flow diagram showing an illustrative method 40 for delivering a web page that displays a video. A requested web page that includes a WebAssembly Module is delivered to a web browser of a requesting device, as indicated at block 32. The Web Assembly Module includes a plurality of video decoders each for decoding a corresponding one of a plurality of video encoding formats. An encoded video is delivered for display by the requested web page, wherein the encoded video is encoded in a particular one of the plurality of video encoding formats, as indicated at block 34. The web page may identify a particular one of the plurality of video encoding formats, as indicated at block 42. A first channel of the WebAssembly Module may be initialized for receiving the encoded video having the particular one of the plurality of video encoding formats, as indicated at block 44. The encoded video is decoded in the first channel using a respective one of the plurality of video decoders of the WebAssembly Module that corresponds to the particular one of the plurality of video encoding formats of the delivered encoded video, as indicated at block 36.

Figure 4:
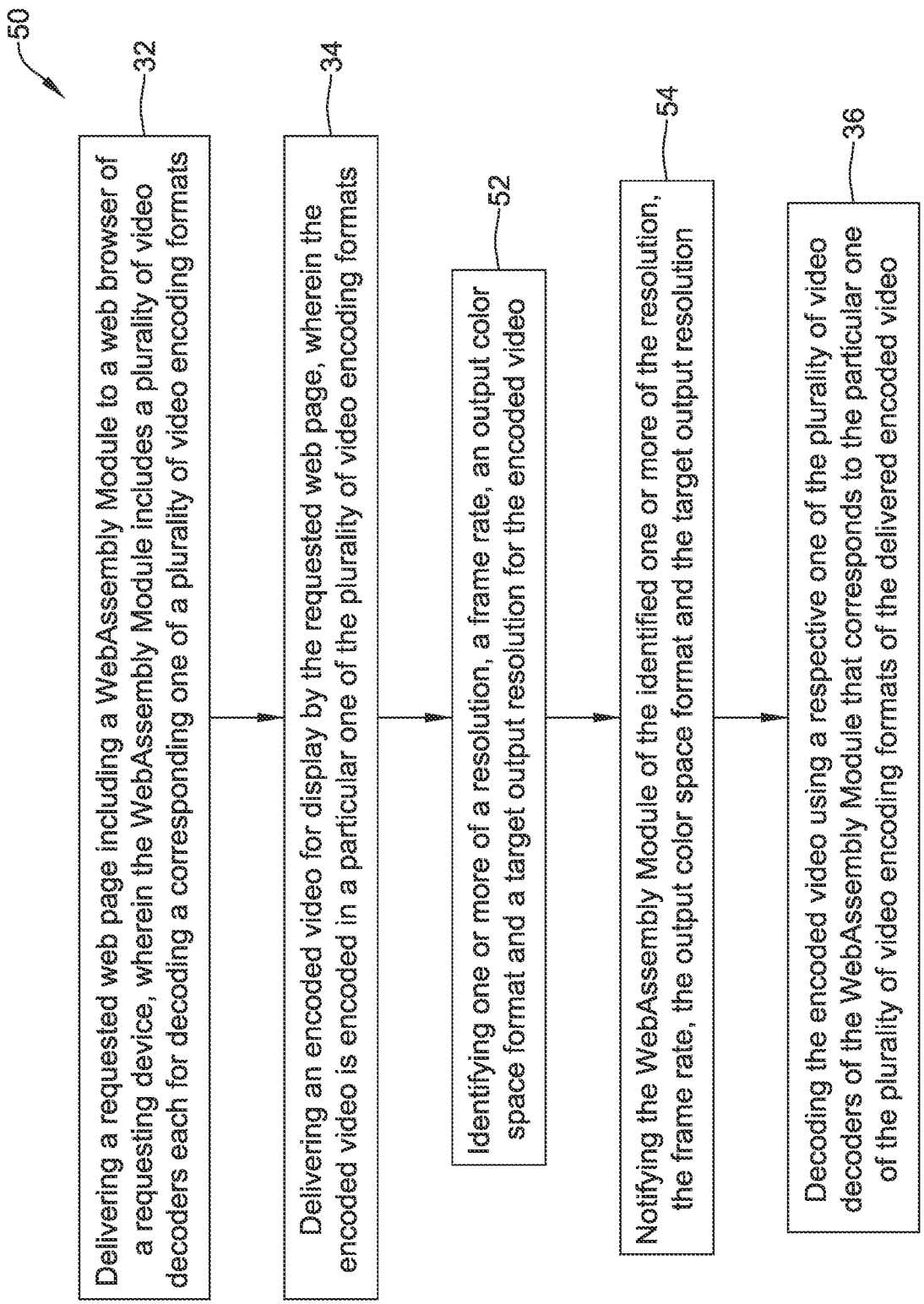
FIG. 4 is a flow chart showing an illustrative method for delivering a web page.

FIG. 4 is a flow diagram showing an illustrative method 50 for delivering a web page that displays a video. A requested web page that includes a WebAssembly Module is delivered to a web browser of a requesting device, as indicated at block 32. The Web Assembly Module includes a plurality of video decoders each for decoding a corresponding one of a plurality of video encoding formats. An encoded video is delivered for display by the requested web page, wherein the encoded video is encoded in a particular one of the plurality of video encoding formats, as indicated at block 34. One or more of a resolution, a frame rate, an output color space format and a target output resolution for the encoded video may be identified, as indicated at block 52. The WebAssembly Module may be notified of the identified one or more of the resolution, the frame rate, the output color space format and/or the target output resolution, as indicated at block 54. In some cases, an output color space format for the decoded video may be identified, and the WebAssembly Module may convert a color space format of the decoded video to the identified output color space format. In some instances, a resolution for the decoded video may be identified, and the WebAssembly Module may resize the resolution of the decoded video to match the identified target output resolution. The encoded video is decoded using a respective one of the plurality of video decoders of the WebAssembly Module that corresponds to the particular one of the plurality of video encoding formats of the delivered encoded video, as indicated at block 36.

Figure 5:
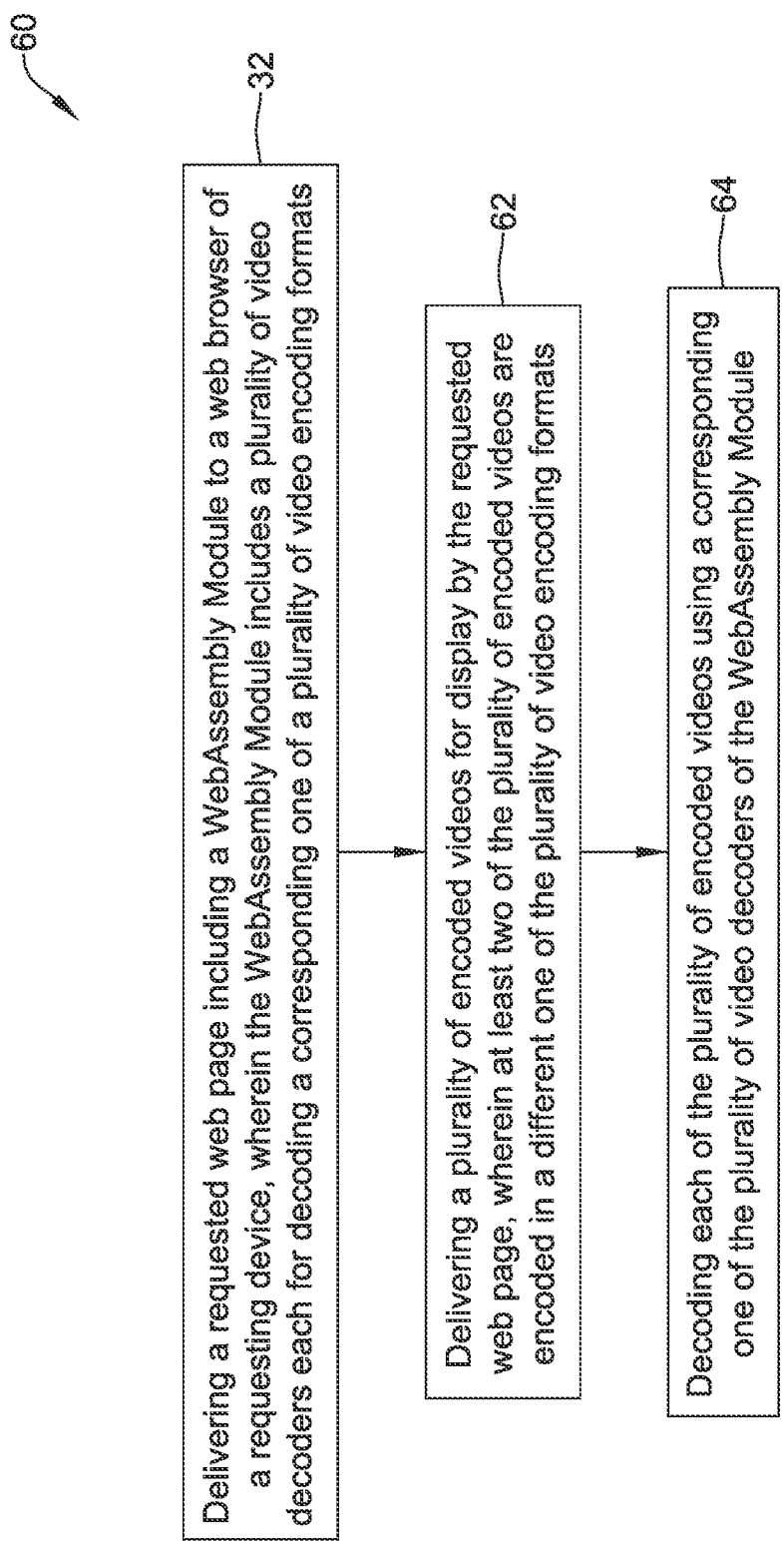
FIG. 5 is a flow chart showing an illustrative method for delivering a web page.

FIG. 5 is a flow diagram showing an illustrative method 60 for delivering a web page that displays a video. A requested web page that includes a WebAssembly Module is delivered to a web browser of a requesting device, as indicated at block 32. The Web Assembly Module includes a plurality of video decoders each for decoding a corresponding one of a plurality of video encoding formats. A plurality of encoded videos are delivered for display by the requested web page, wherein at least two of the plurality of encoded videos are encoded in a different one of the plurality of video encoding formats, as indicated at block 62. Each of the plurality of encoded videos may be decoded using a corresponding one of the plurality of video decoders of the WebAssembly Module, as indicated at block 64. In some instances, a separate video decoding channel may be initialized in the WebAssembly Module for each of the plurality of encoded videos, the separate video decoding channels decoding a respective one of the plurality of encoded videos.

Figure 6:
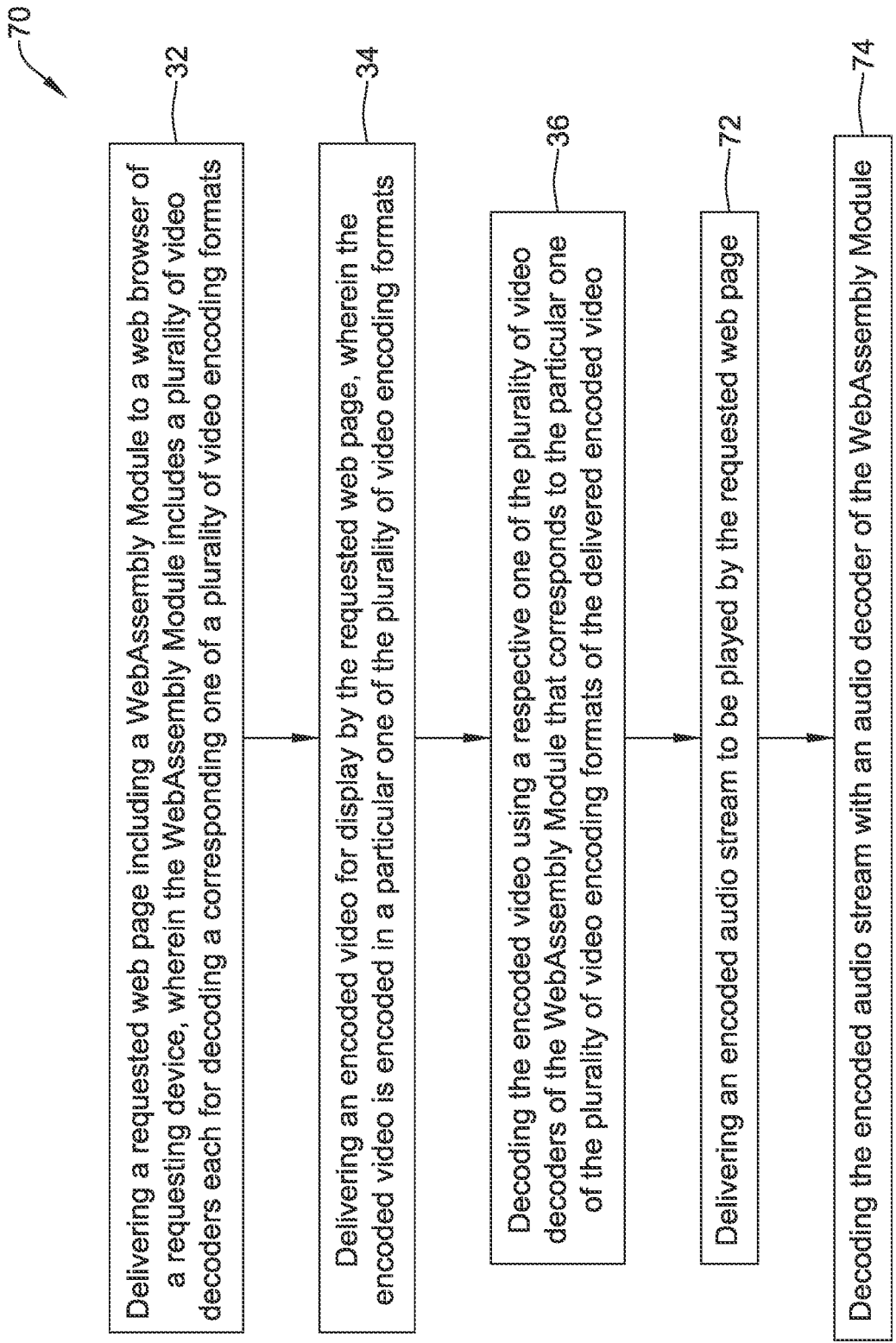
FIG. 6 is a flow chart showing an illustrative method for delivering a web page.

FIG. 6 is a flow diagram showing an illustrative method 70 for delivering a web page that displays a video. A requested web page that includes a WebAssembly Module is delivered to a web browser of a requesting device, as indicated at block 32. The Web Assembly Module includes a plurality of video decoders each for decoding a corresponding one of a plurality of video encoding formats. An encoded video is delivered for display by the requested web page, wherein the encoded video is encoded in a particular one of the plurality of video encoding formats, as indicated at block 34. The encoded video is decoded using a respective one of the plurality of video decoders of the WebAssembly Module that corresponds to the particular one of the plurality of video encoding formats of the delivered encoded video, as indicated at block 36.

As indicated at block 72, an encoded audio stream may be delivered to be played by the requested web page. some cases, an audio decoding channel may be initialized in the WebAssembly Module for decoding the encoded audio stream. As indicated at block 74, the encoded audio stream may be decoded with an audio decoder of the WebAssembly Module. In some cases, the decoded audio stream may be resampled by the WebAssembly Module to meet a predetermined sample rate.

Figure 7:
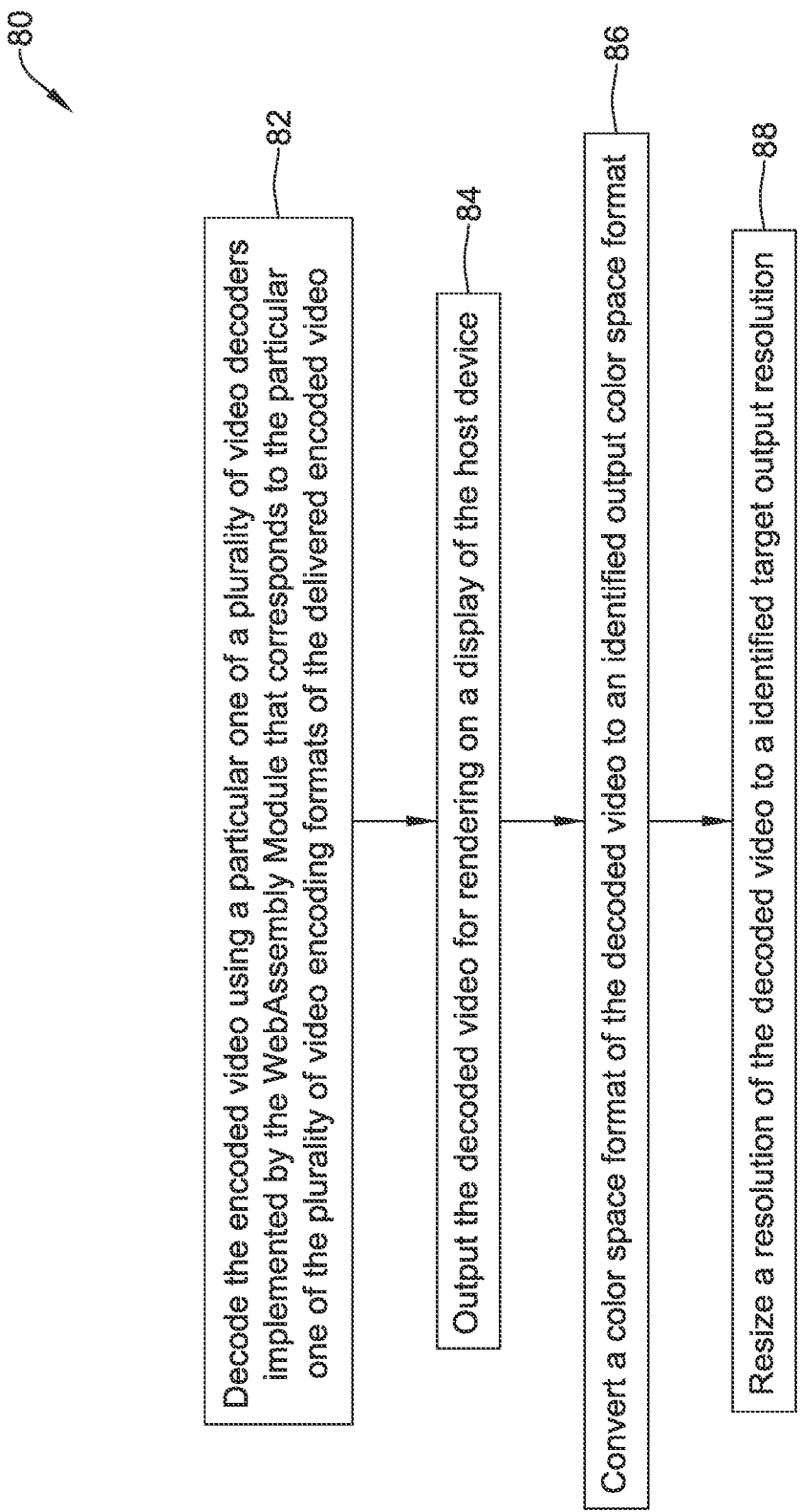
FIG. 7 is a flow chart showing an illustrative method for delivering a web page.

FIG. 7 is a flow diagram showing an illustrative method 80 for displaying videos on a web page. In some cases, for example, the illustrative method 80 may be manifested in a non-transitory, computer-readable storage medium having stored thereon instructions that implement a WebAssembly Module, the WebAssembly Module augmenting video decoding capabilities of a web browser running on a host device, the WebAssembly Module delivered to the web browser with a web page that displays an encoded video that is encoded in a particular one of a plurality of video encoding formats, the WebAssembly Module when executed by the host device causing the host device to carry out several steps. As indicated at block 82, the host device may be caused to decode the encoded video using a particular one of a plurality of video decoders implemented by the WebAssembly Module that corresponds to the particular one of the plurality of video encoding formats of the delivered encoded video. As indicated at block 84, the host device may be caused to render the decoded video on a display of the host device.

In some cases, the host device may be caused to convert a color space format of the decoded video to an identified output color space format, as indicated at block 86. The host device may additionally or alternatively be caused to resize a resolution of the decoded video to a predetermined output resolution, as indicated at block 88.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method comprising:
    receiving, from a web browser a request for delivery of a requested web page, the requested web page requesting display of:
        a first video encoded in a first video encoding format from amongst a plurality of video encoding formats;
        a second video encoded in a second video encoding format from amongst the plurality of video encoding formats, wherein the first video encoding format is different from the second video encoding format;
    rendering the requested web page comprising a resource to the web browser of a requesting device, the resource comprising a plurality of video decoders each for decoding a corresponding one of the plurality of video encoding formats;
    initiating, by the resource, a first channel to decode the first encoded video using a first one of the plurality of video decoders;
    initiating, by the resource, a second channel to decode the second encoded video using a second one of the plurality of video decoders, wherein the first channel and the second channel are configured to operate concurrently in parallel;
    identifying, by the resource, at least one of: a target output frame rate, a target output color space format, and a target output resolution for the first decoded video and the second decoded video; and
    processing, by the resource, the first decoded video and the second decoded video to produce a first output video and a second output video in accordance with the at least one of the target output frame rate, the target output color space format, and the target output resolution.

2. The method of claim 1, further comprising:
initiating a connection by the web page to a media source; and
sending one or more commands to the media source to start streaming the first encoded video to the web page, wherein the first encoded video comprises a first encoded video stream.

3. The method of claim 1, further comprising:
creating, by the resource, one or more channels;
initializing the first channel of the resource, wherein the first channel receives the first encoded video having the first one of the plurality of video encoding formats and decodes the first encoded video using the corresponding one of the plurality of video decoders of the resource;
delivering the second encoded video for display by the requested web page, wherein the second encoded video is encoded in the second one of the plurality of video encoding formats that is different from the first one of the plurality of video encoding formats of the first encoded video; and
initializing the second channel of the resource, wherein the second channel receives the second encoded video having the second one of the plurality of video encoding formats and decodes the received second encoded video using the corresponding one of the plurality of video decoders of the resource, the first channel and the second channel configured to decode their respective first and second encoded videos in parallel.

4. The method of claim 1, further comprising:
identifying, by the requested web page, the target output color space format for the first encoded video; and
converting, by the resource, the color space format of the decoded video to the target output color space format.

5. The method of claim 1, further comprising:
identifying, by the requested web page, the target output resolution for the first encoded video; and
resizing, by the resource, the resolution of the decoded video to the target output resolution.

6. The method of claim 1, further comprising:
delivering a plurality of encoded videos for display by the requested web page, including the first encoded video, wherein at least two of the plurality of encoded videos are encoded in a different one of the plurality of video encoding formats; and
concurrently decoding each of the plurality of encoded videos using a corresponding one of the plurality of video decoders of the resource.

7. The method of claim 6, further comprising:
initializing a separate video decoding channel in the resource for each of the plurality of encoded videos, the separate video decoding channels decoding a respective one of the plurality of encoded videos in parallel.

8. The method of claim 1 further comprising:
delivering an encoded audio stream to be played by the requested web page;
initializing an audio decoding channel in the resource for decoding the encoded audio stream;
decoding the encoded audio stream using the initialized audio decoding channel in the resource; and
resampling the decoded audio stream by the resource to meet a predetermined sample rate.

9. The method of claim 1 further comprising:
delivering an encoded audio stream to be played by the requested web page; and
decoding the encoded audio stream with an audio decoder of the resource.

10. The method of claim 1, further comprising:
operating the web browser in a sand box of the requesting device such that the resource is restricted to the same sand box.

11. The method of claim 1, further comprising:
initiating, by the resource, a first channel to decode a first encoded video using a first video encoding format, a first target output frame rate, a first target output color space format, and a first target output resolution; and
initiating, by the resource, a second channel to decode a second encoded video using a second video encoding format, a second target output frame rate, a second target output color space format, and a second target output resolution, wherein the first channel and the second channel operate concurrently in parallel.

12. A system comprising:
a memory configured to store executable instructions;
a processor operably coupled to the memory and configured to execute the executable instructions, the executable instructions causing the processor to:
receive from a web browser a request for delivery of a requested web page, the requested web page is configured to display:
a first video encoded in a first video encoding format from amongst a plurality of video encoding formats;
a second video encoded in a second video encoding format from amongst the plurality of video encoding formats, wherein the first video encoding format is different from the second video encoding format;
render the requested web page comprising a resource to the web browser, the resource comprises a plurality of video decoders each for decoding a corresponding one of the plurality of video encoding formats, the resource is configured to:
initiate a first channel to decode the first encoded video using a first one of the plurality of video decoders;
initiate a second channel to decode the second encoded video using a second one of the plurality of video decoders, wherein the first channel and the second channel are configured to operate concurrently in parallel;
identify at least one of: a target output frame rate, a target output color space format, and a target output resolution for the first decoded video and the second decoded video; and
process the first decoded video and the second decoded video to produce a first output video and a second output video in accordance with the at least one of the target output frame rate, the target output color space format, and the target output resolution.

13. The system of claim 12, wherein the requested web page is configured to initiate a connection to a media source and send one or more commands to the media source to start delivery of the first encoded video and the second encoded video to the requested web page.

14. The system of claim 13, wherein the media source is remote from the system.

15. The system of claim 12, wherein the requested web page is configured to perform at least one of:
identify an output color space format for the first encoded video, and the resource is configured to convert a color space format of the decoded video to the identified output color space format; and identify a predetermined output resolution for the first encoded video, and the resource is configured to resize the resolution of the decoded video to the predetermined output resolution.

16. The system of claim 12, wherein the resource is configured to:
receive an encoded audio stream to be played by the requested web page;
initialize an audio decoding channel to decode the encoded audio stream;
decode the encoded audio stream using the initialized audio decoding channel; and
resample the decoded audio stream to meet a predetermined sample rate.

17. The system of claim 12, wherein the resource is configured to:
initiate the first channel to decode the first encoded video using a first video encoding format, a first target output frame rate, a first target output color space format, and a first target output resolution; and
initiate the second channel to decode the second encoded video using a second video encoding format, a second target output frame rate, a second target output color space format, and a second target output resolution, wherein the first channel and the second channel operate concurrently in parallel.

18. A non-transitory, computer-readable storage medium having stored thereon instructions that implement a resource, the resource augmenting video decoding capabilities of a web browser running on a host device, the resource delivered to the web browser with a web page, the resource when executed by the host device causing the host device to:
receive from the web browser a request for delivery of a requested web page, the requested web page requesting display of:
a first video encoded in a first video encoding format from amongst a plurality of video encoding formats;
a second video encoded in a second video encoding format from amongst the plurality of video encoding formats, wherein the first video encoding format is different from the second video encoding format;
initiate a first channel to decode the first encoded video using a first one of a plurality of video decoders of the resource;
initiate a second channel to decode the second encoded video using a second one of the plurality of video decoders, wherein the first channel and the second channel are configured to operate concurrently in parallel;
identify at least one of: a target output frame rate, a target output color space format, and a target output resolution for the first decoded video and the second decoded video;
convert the first decoded video and the second decoded video in accordance with the at least one of a target output frame rate, a target output color space format, and a target output resolution that corresponds to a first output video and a second output video; and
render the first output video and the second output video on a display of the host device.

19. The non-transitory, computer-readable storage medium of claim 18, wherein the resource when executed by the host device causes the host device to:
initialize an audio decoding channel to decode an encoded audio stream;
decode the encoded audio stream using the initialized audio decoding channel; and
resample the decoded audio stream to meet a predetermined sample rate.

20. The non-transitory, computer-readable storage medium of claim 18, wherein the resource when executed by the host device causes the host device to:
initiate the first channel to decode the first encoded video using a first video encoding format, a first target output frame rate, a first target output color space format, and a first target output resolution; and
initiate the second channel to decode the second encoded video using a second video encoding format, a second target output frame rate, a second target output color space format, and a second target output resolution, wherein the first channel and the second channel operate concurrently in parallel.

* * * * *